United States Patent [19]

Galli et al.

[11] 3,912,536
[45] Oct. 14, 1975

[54] NEGATIVE ELECTRODE FOR SOLID ELECTROLYTE CELLS

[75] Inventors: Riccardo Galli; Franco Olivani, both of Novara, Italy

[73] Assignee: Montecatini Edison S.p.A., Milan, Italy

[22] Filed: Jan. 7, 1974

[21] Appl. No.: 431,427

Related U.S. Application Data

[63] Continuation of Ser. No. 237,758, March 24, 1972, abandoned.

[30] Foreign Application Priority Data

Mar. 27, 1971 Italy.................................. 22390/71

[52] U.S. Cl.............................. 136/6 R; 136/83 R
[51] Int. Cl.$^2$......................................... H01M 35/00
[58] Field of Search.......................... 136/6, 83, 100

[56] References Cited
UNITED STATES PATENTS

| | | |
|---|---|---|
| 3,531,328 | 9/1970 | Bro et al. ...................... 136/100 R |
| 3,607,417 | 9/1971 | McRae et al. ................... 136/154 X |
| 3,672,995 | 6/1972 | Brown et al. ................... 136/83 R X |
| 3,703,415 | 11/1972 | Mitoff et al. ...................... 136/83 R |
| 3,730,771 | 5/1973 | Gannenberger et al. ............... 136/6 |
| 3,762,955 | 10/1973 | Dubin .............................. 136/83 R |
| 3,773,558 | 11/1973 | Charbonnier et al. ........... 136/6 LN |
| 3,793,080 | 2/1974 | Hess.................................... 136/83 |

Primary Examiner—John H. Mack
Assistant Examiner—C. F. Lefevour
Attorney, Agent, or Firm—Stevens, Davis, Miller & Mosher

[57] ABSTRACT

An alkali metal negative electrode is disclosed for solid electrolyte electrochemical devices, consisting essentially of a solution of an alkali metal in one or more aprotic organic solvents. Complexing agents for the alkali metal may be present in the solution. The alkali metal solution may be saturated with respect to the alkali metal, which may be present as solid phase. The aprotic organic solvents may be selected from the class consisting of ethers, polyethers, N-hexalkylphosphotriamides and tertiary amines.

12 Claims, 1 Drawing Figure

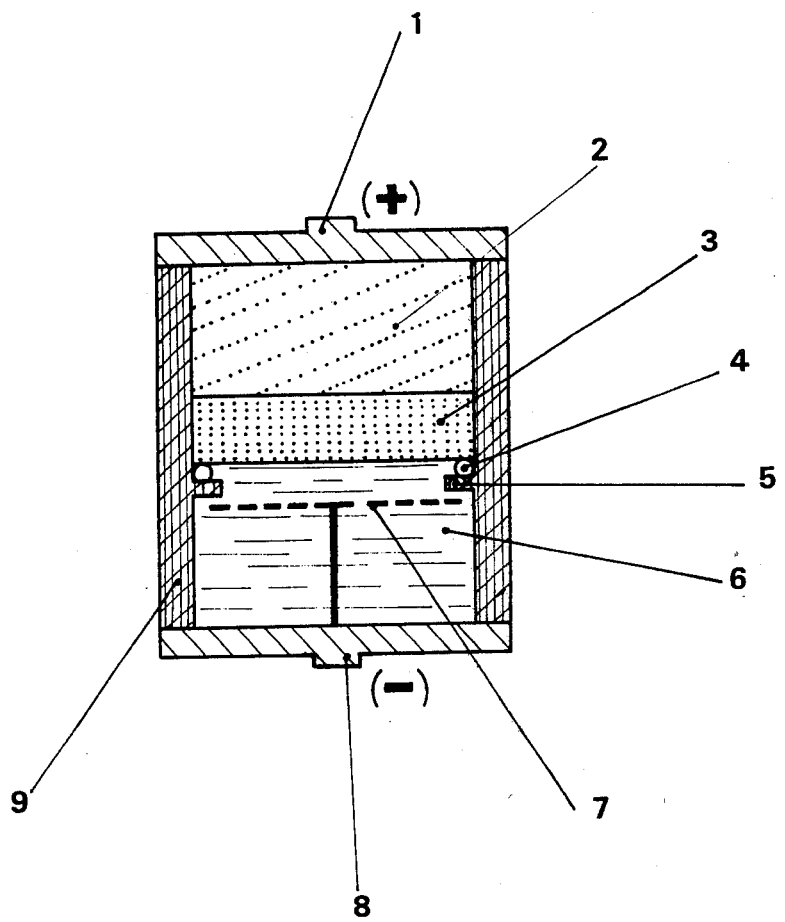

NEGATIVE ELECTRODE FOR SOLID ELECTROLYTE CELLS

This is a continuation of application Ser. No. 237,758, filed Mar. 24, 1972, now abandoned.

The present invention relates to a new type of alkali metal negative electrode for electrochemical devices, and particularly for solid electrolyte cells.

Investigations are being carried out at present with a view to developing high energy density cells for several applications, such as, for instance, electric cars.

Particularly interesting high energy density cells are those utilizing an electrolyte consisting of a material in the solid state and of a negative electrode consisting of an alkali metal. For convenience, such cells can be schematically indicated by the symbol M/ES/C, wherein M means the alkali metal, ES the M+ cation-conductive solid electrolyte, and C the cathodic material constituting the positive electrode.

In the traditional liquid electrolyte cells — as is well known — the electrode surface in contact with the electrolyte is not only the electrode geometrical boundary surface proper, but the entire wetted surface of the electrode which, owing to the porosity of the electrode material, is larger than the geometrical boundary surface.

Conversely, in cells of the M/ES/C type the contact surface between the alkali metal of the negative electrode and the solid electrolyte can be, at most, only the geometrical boundary surface. This fact represents a considerable drawback in that it limits the electrode kinetics.

It has been suggested to obviate said drawback by operating above the melting point of the alkali metal, so as to have a negative electrode which is in the liquid state. But it is clear that such a cell presents the considerable drawback of working at temperatures higher than room temperature. Its realization, moreover, would involve the adoption of special measures, for instance in order to bring the alkali metal above the melting point and to keep it under those conditions during the current delivery.

An object of the present invention is therefore the provision of solid electrolyte cells, utilizing negative electrodes based on alkali metals, in which said negative electrodes are in the liquid state at room temperature; namely, at the temperature spontaneously assumed by the electrodes according to ambient conditions.

This and other objects are attained by the present invention, whose object is an alkali metal negative electrode for electrochemical devices and particularly for solid electrolyte cells, characterized in that it consists or consists essentially in the use of a solution of an alkali metal in one or more aprotic organic solvents for the purpose indicated.

Although the negative electrode which is the object of the present invention can be based on any alkali metal, in practice those preferably used are lithium, sodium or potassium.

The organic solvents selected for preparing the electrode are such as to allow one to obtain both a high alkali metal concentration and a high electric conductivity. Suitable solvents are aprotic organic solvents which are free from active hydrogens, in particular ethers, polyethers, N-hexalkylphosphotriamides and tertiary amines. Examples of such solvents are: tetrahydrofuran (for simplicity's sake hereinafter indicated by THF); 1-alkoxy-methyl-tetrahydrofurans; dimethylethers of ethylene glycol, of diethylene glycol, of triethylene glycol, of tetraethylene glycol; cyclic tetramer of propylene oxide; N-hexamethyl-phosphotriamide (for simplicity's sake hereinafter indicated with HMPT); and the like.

Such solvents may be used either individually or in admixture among themselves or with diluents, such as hydrocarbons (alkanes, cycloalkanes, aromatic hydrocarbons) for instance hexane, cyclohexane, benzene, and the like.

It may be remarked that solutions of alkali metals in solvents containing active hydrogens, such as, for example, ammonia and primary or secondary amines, are ill-suited; such solutions are unstable in the long run as the active hydrogens react with the alkali metal according to one of the reactions:

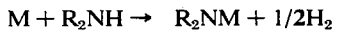

The concentration of the dissolved alkali metal shall be high enough to provide a solution with high electric conductivity. Generally, the electrical conductivity is preferably not lower than $10^{-4}$ ohm$^{-1}$ cm$^{-1}$.

The concentration of the alkali metal in solution may if desired be raised by adding to the solution one or more agents capable of forming charge transfer complexes with the alkali metal. Also, the complexing agents to be added to the alkali metal solution shall be such as will result in a high concentration of alkali metal in solution as well as a high electrical conductivity of such solution. Examples of suitable complexing agents are bipyridyls, quinolines, diphenyl, stilbene, diphenyl-acetylene, condensed aromatic nucleus compounds such as naphthalene, phenanthrene, anthracene, etc.

Satisfactory results are usually attained with alkali metal molar solutions of at least $10^{-3}$ molar; particularly good results are obtained from molar concentrations ranging from 0.1 to 1 molar, and even higher.

Generally, the molar concentration of the complexing agent should preferably be of the same order of magnitude as the molar concentration of the alkali metal in solution. Good results are attained for instance with a molar concentration of complexing agent which is 1–2 times as high as that of the alkali metal in solution.

It is also possible to operate with saturated solutions of alkali metal which is present as solid phase. In such case, when the cell operates to deliver current, the alkali metal in the form of M+ ion migrates through the solid electrolyte towards the positive electrode; the solid phase alkali metal that is present then makes up for such alkali metal impoverishment by dissolving in the solution in the same quantity corresponding to that which has migrated to and through the solid electrolyte.

The alkali metal negative electrode according to the present invention can be utilized in any electrochemical device and particularly in any solid electrolyte cell of the M/ES/C type. Solid electrolyte ES can be any M+ cation-conductive material, such as lithium halides, with optional dopings to increase the conductivity for Li+ ions, or the so-called beta-aluminas. The beta-aluminas are solid compounds, of the general formula $M_2O, xAl_2O_3$, wherein M is an alkali metal and $x$ is a number between 5 and 11. An example of beta-alumina is the sodium beta-alumina $Na_2O \cdot 11Al_2O_3$.

Oxidizing materials such as halogens or their compounds, sulphur, sulphides, halides, oxides, etc. may be used as cathodic material C for the positive electrode. For instance, it is possible to use $I_2$, $(C_4H_9)_4NI \cdot nI_2$ (tetrabutylammonium polyiodide), CuS, $CuCl_2$, $MnO_2$, etc.

The FIGURE in the accompanying drawing shows schematically, but by way of a non-limitative example, an M/ES/C cell in which the negative electrode consists of a solution according to the present invention.

The cell, shown in vertical section, consists of a cylindrical shell 9 made of conventional insulating material and closed by two metal caps 1 and 8 acting as terminals. Terminal 1 of the positive electrode contacts positive electrode 2 (constituted by a solid oxidizing material mixed with a conductive powder, for example a graphite powder). Solid electrolyte 3 consists of a sintered body of M+ cation-conductive material.

The gasket 4 is a silicone rubber ring which, together with the support 5 (made of the same insulating material as shell 9), forms a hermetic seal and prevents liquid 6 from flowing along the wall, in order to avoid any contact with electrode 2. The solution 6 of the alkali metal constitutes the negative electrode. The nickel gauze 7 acts as collector of the negative electrode and is connected with the terminal 8 of the negative electrode.

The alkali metal negative electrode which is the object of this invention offers several advantages. The fact of the alkali metal being in the liquid state at room temperature enables the cell to deliver current at room temperature. On the other hand, of course, should the conditions of use require it, the electrode is capable of working satisfactorily at temperatures different from room temperature while remaining in the liquid state at such different temperatures.

The fact of the electrode not being solid provides a better contact with the electrolyte, thus improving the kinetics of the electrodic process.

Furthermore, the electrode according to the present invention, unlike electrodes consisting of alkali metals in the solid state, does not undergo any substantial changes in volume when the cell is operating to deliver current, good constant contact with the electrolyte being thus assured.

The following examples are given to still better illustrate the properties, advantages, and applications of the alkali metal negative electrode which is the object of the present invention:

EXAMPLE 1

A solution containing 2 gr of naphthalene in 20 cc of tetrahydrofuran (THF) is introduced into a little flask provided with stirrer, reflux cooler, nitrogen inlet and outlet tubes and feed funnel. Under stirring and in a nitrogen stream, 0.5 gr of lithium in small pieces are then added. In a short time the lithium dissolves and the solution turns dark; the lithium in excess is present as solid phase. The solution thus obtained is kept in a nitrogen atmosphere. The conductivity of the solution at 20°C is $1.5 \cdot 10^{-3}$ $ohm^{-1}$ $cm^{-1}$.

In an inert and anhydrous atmosphere of argon, the solution is contacted with a thin LiI sintered disk (surface: about 0.8 $cm^2$, thickness: 0.3 mm) which, in its turn, contacts a disk having the same dimensions and consisting of an intimate mixture of iodine (80 percent by weight) and graphite (20 percent by weight).

The cell thus obtained generates a 2.62 V electromotive force which is checked for one week and is found to be constant. The theoretical value of the electromotive force of a lithium/iodine cell, calculated from the value of the LiI formation free energy, is 2.79 V. Therefore the value actually obtained is in good agreement with the calculated value and proves that the lithium saturated solution actually behaves as a lithium electrode.

EXAMPLE 2

By using the same lithium solution as in Example 1, some cells are assembled utilizing various solid electrolytes and various cathodic materials for the positive electrode.

More precisely, lithium iodide and lithium bromide are employed as solid electrolytes.

The following materials are used as cathodic materials for the positive electrode: $AgO - Ag_7NO_{11}$ (a mixture of AgO and $Ag_7NO_{11}$ obtained by anodic oxidation of a silver nitrate aqueous solution on graphite anodes); CuS; S + graphite (a mixture containing 78 percent by weight of sulphur and 22 percent by weight of graphite); $MnO_2$ + graphite (a mixture containing 79 percent by weight of manganese dioxide and 21 percent by weight of graphite); bromine-impregnated graphite.

The following reports the values of the electromotive force (E.M.F.) measured when the various cells are thus assembled:

| Solid electrolyte (ES) | Positive electrode (C) | E.M.F. |
|---|---|---|
| LiI | $AgO - Ag_7NO_{11}$ | 2.50 V |
| LiI | CuS | 1.80 V |
| LiI | S + graphite | 2.75 V |
| LiI | $MnO_2$ + graphite | 2.05 V |
| LiBr | $Br_2$ + graphite | 3.01 V |

EXAMPLE 3

According to the method of Example 1, a lithium-saturated solution is prepared by dissolving 0.5 gr of lithium in a solution obtained by mixing 25 cc of THF with 7 cc of quinoline.

The alkali metal solution thus obtained is employed to prepare a cell of the type:

$$(Li)_s/LiI/I_2$$

wherein $(Li)_s$ means the lithium-saturated solution constituting the negative electrode, while the iodine electrode consists of an intimate mixture of $I_2$ (80 percent by weight) and graphite (20 percent by weight).

The value of the thus-generated electromotive force (E.M.F.) is 1.45 V.

EXAMPLE 4

According to the same method of Example 1, sodium-saturated solutions in different solvent systems are prepared. Such solutions are used to prepare cells of the type:

$$(Na)_s/ES/I_2$$

wherein $(Na)_s$ means the sodium-saturated solution which is the negative electrode, the solid electrolyte (ES) consists of a sintered body of beta-alumina (obtained by hot-pressing a powder of commercial beta-alumina refractories), and the iodine positive electrode consists of an intimate mixture of $I_2$ (80 percent by weight) and graphite (20 percent by weight).

The following table shows the conductivity values (measured at 20°C) of the various solutions as well as those of the electromotive force (E.M.F.) of the various cells.

| Negative electrode | Solution conductivity (ohm$^{-1}$ cm$^{-1}$) | E.M.F. |
|---|---|---|
| 1.7 gr Na + 2 gr naphthalene + + 25 cc THF | $8.5 \times 10^{-4}$ | 3.1 V |
| 3 gr Na + 0.8 gr phenanthrene + + 20 cc THF | $1.8 \times 10^{-3}$ | 3.0 V |
| 0.5 gr Na + 2.8 gr naphthalene + + 20 cc HMPT | $1.5 \times 10^{-3}$ | 2.7 V |
| 3 gr Na + 1 gr anthracene + + 20 cc THF | $6.4 \times 10^{-4}$ | 2.6 V |
| 1.5 gr Na + 1 g stilbeno + + 20 cc THF | $1.5 \times 10^{-4}$ | 2.29 V |

EXAMPLE 5

A sodium-saturated solution in 2 gr of naphthalene + 20 cc of diethylene glycol diethylether is prepared according to the method of Example 1.

The solution conductivity is $2.5 \times 10^{-4}$ ohm$^{-1}$ cm$^{-1}$.

With such a solution (Na)$_s$, two cells of the type (NA)$_s$/beta-alumina/C are assembled, wherein the solid electrolyte is beta-alumina according to Example 4.

In one of those cells the positive electrode C consists of a mixture containing iodine (80 percent by weight) and graphite (20 percent by weight); the electromotive force is 1.70 V.

In the other cell the positive electrode C consists of a mixture of sulphur (70 percent by weight) and graphite (30 percent by weight); the electromotive force is 1.75 V.

EXAMPLE 6

A solution of 1.5 gr of sodium in 25 cc HMPT is prepared according to the method of Example 1. The solution conductivity is $1.36 \times 10^{-3}$ ohm$^{-1}$ cm$^{-1}$ at 20°C. With such solution (Na)$_s$, a cell of the type (Na)$_s$/beta-alumina/$I_2$ is assembled, wherein the iodine electrode consists of a mixture containing iodine (80 percent by weight) and graphite (20 percent by weight). The electromotive force is 3.4 V.

EXAMPLE 7

By operating according to Example 1, a solution containing 4 gr of sodium and 2 gr of diphenyl in 25 cc of diethylene glycol dimethylether is prepared. The solution conductivity at 20°C is $7.85 \times 10^{-3}$ ohm$^{-1}$ cm$^{-1}$. With such solution (Na)$_s$, a cell (Na)$_s$/beta-alumina/(C$_4$H$_9$)$_4$NI.I$_2$ + C is assembled, wherein the positive electrode consists of a mixture of tetrabutylammonium triiodide (80 percent by weight) and graphite (20 percent by weight). The electromotive force of this cell is 2.8 V.

EXAMPLE 8

The test illustrated by Example 7 is repeated but this time dissolving the same quantities of sodium and diphenyl in 24 cc of diethylene glycol dimethylether and 1 cc of benzene.

The conductivity of the obtained solution is slightly lower than that of the previous one ($2.85 \times 10^{-3}$ ohm$^{-1}$ cm$^{-1}$ at 20°C), but the electromotive force value of the cell remains unchanged.

What is claimed is:

1. An electrochemical cell consisting essentially of:
    an alkali metal negative electrode,
    an oxidizing material positive electrode, and
    an electrolyte in the solid state interposed
between said negative electrode and said positive electrode, wherein said negative electrode is a solution of an alkali metal in one or more aprotic organic solvents.

2. The cell of claim 1 wherein said aprotic organic solvent is selected from the group consisting of ethers, polyethers, N-hexalkyl-phosphotriamides and tertiary amines.

3. The cell of claim 2 wherein said aprotic organic solvent is tetrahydrofuran.

4. The cell of claim 2 wherein said aprotic organic solvent is N-hexamethyl-phosphotriamide.

5. The cell of claim 2 wherein said aprotic organic solvent is diethylene glycol diethylether.

6. The cell of claim 2 wherein said aprotic organic solvent is diethylene glycol dimethylether.

7. The cell of claim 1 wherein one or more complexing agents for the alkali metal are employed in the solution and are selected from the group consisting of bipyridyls, quinolines, diphenyl, stilbene, diphenylacetylene and condensed aromatic nucleus compounds.

8. The cell of claim 1 wherein said alkali metal solution is saturated with respect to the alkali metal which is present as solid phase.

9. The cell of claim 1 wherein said electrolyte in the solid state is an alkali metal cation-conductive solid electrolyte.

10. The cell of claim 9 wherein said alkali metal is lithium and said solid electrolyte is selected from the group consisting of lithium halides and lithium beta-aluminas.

11. The cell of claim 9 wherein said solid electrolyte is an alkali metal beta-alumina.

12. The cell of claim 11 wherein said solid electrolyte is a beta-alumina having the formula $M_2O.xAl_2O_3$, wherein M is an alkali metal and X is a number between 5 and 11.

* * * * *